(12) United States Patent
Yang et al.

(10) Patent No.: US 12,470,845 B2
(45) Date of Patent: Nov. 11, 2025

(54) HIGH DYNAMIC-RANGE (HDR) PIXEL CIRCUIT, COLOR-IMAGE SENSOR PACKAGE STRUCTURE, AND METHOD FOR OPERATING HDR PIXEL CIRCUIT

(71) Applicant: TAIWAN SEMICONDUCTOR MANUFACTURING COMPANY LTD., Hsinchu (TW)

(72) Inventors: Ming-Hsien Yang, Taichung (TW); Huan-En Lin, Kaohsiung (TW); Chia-Yu Wei, Tainan (TW); Chun-Hao Chou, Tainan (TW); Kuo-Cheng Lee, Tainan (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 72 days.

(21) Appl. No.: 18/599,126

(22) Filed: Mar. 7, 2024

(65) Prior Publication Data

US 2025/0287118 A1  Sep. 11, 2025

(51) Int. Cl.
*H04N 25/59* (2023.01)
*H04N 25/771* (2023.01)

(52) U.S. Cl.
CPC .......... *H04N 25/59* (2023.01); *H04N 25/771* (2023.01)

(58) Field of Classification Search
None
See application file for complete search history.

(56) References Cited

U.S. PATENT DOCUMENTS

2018/0084164 A1* 3/2018 Hynecek ................ H04N 25/17

OTHER PUBLICATIONS

International Roadmap for Devices and Systems, 2022 Update, More Moore, Published by IEEE.

* cited by examiner

*Primary Examiner* — Mark T Monk
(74) *Attorney, Agent, or Firm* — WPAT LAW; Anthony King

(57) ABSTRACT

The present disclosure provides a high-dynamic range (HDR) pixel circuit, which includes a pixel subcircuit and a light-responsive switch circuit. The pixel subcircuit includes a photodetector, a capacitor, and a source-follower transistor. The source-follower transistor is enabled using a power supply voltage provided by the light-responsive switch circuit 300 in response to the HDR pixel circuit being in a low light illuminance. The source-follower transistor is enabled using a first voltage generated by the photodetector in response to the HDR pixel circuit being in a high light illuminance. A first voltage detected by the photodetector and a second voltage associated with electric charges stored in the capacitor are outputted to form a HDR pixel value.

20 Claims, 19 Drawing Sheets

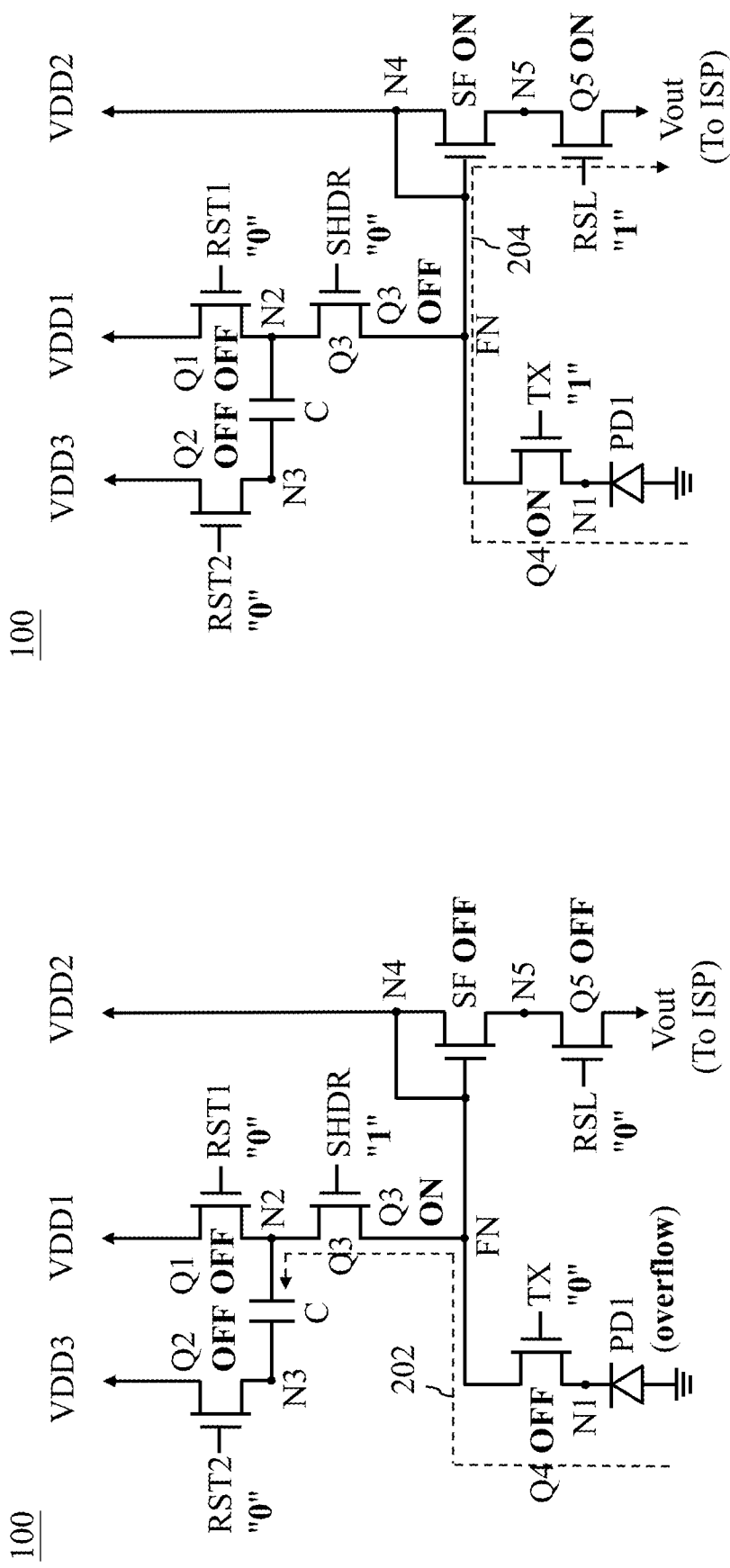

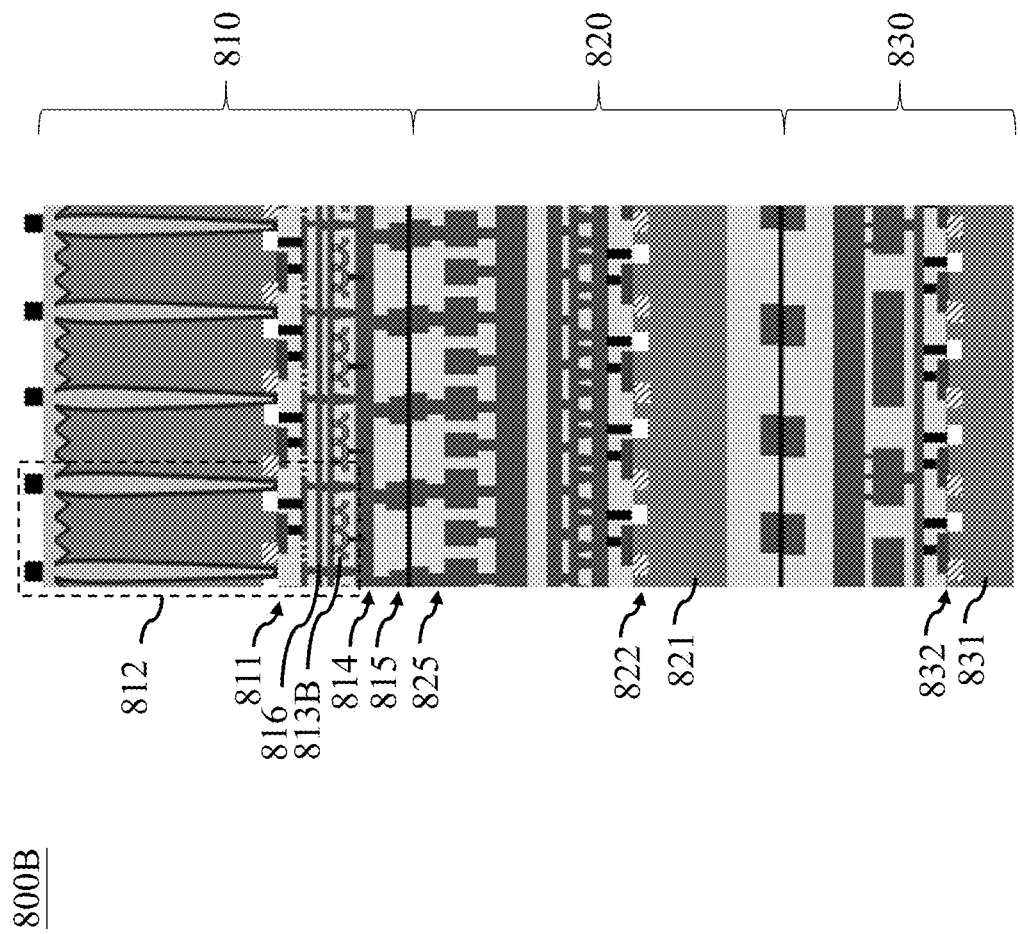

HIGH DYNAMIC-RANGE (HDR) PIXEL CIRCUIT, COLOR-IMAGE SENSOR PACKAGE STRUCTURE, AND METHOD FOR OPERATING HDR PIXEL CIRCUIT

BACKGROUND

The present disclosure relates to color image sensors, and, in particular, to a high-dynamic range (HDR) pixel circuit, a color-image sensor package structure, and a method for operating an HDR pixel circuit.

In recent years, the utilization of CMOS (Complementary Metal-Oxide-Semiconductor) image sensors has become widespread across a range of industries, including smartphone manufacturing, digital photography, security systems, and medical imaging. These sensors have significantly transformed the way in which we capture and process images, thanks to their exceptional resolution, low power consumption, and rapid processing capabilities. Moreover, CMOS image sensors have facilitated the emergence of innovative applications such as augmented reality, facial recognition, and autonomous vehicles. Furthermore, the incorporation of high dynamic range (HDR) imaging technology allows for the production of high-quality images under both low and high light conditions within the same scene. The continuous development and innovation in CMOS image sensor technology have a profound impact on various sectors.

BRIEF DESCRIPTION OF THE DRAWINGS

Aspects of the present disclosure are best understood from the following detailed description when read with the accompanying figures. It is emphasized that, in accordance with standard practice in the industry, various features are not drawn to scale. In fact, the dimensions of the various features can be arbitrarily increased or reduced for clarity of discussion.

FIGS. 2A to 2E are schematic diagrams illustrating operations of the pixel circuit in FIG. 1.

FIGS. 8A-8C are cross sections of a stacked CIS structure in accordance with different embodiments of the present disclosure.

DETAILED DESCRIPTION

Figure 1:
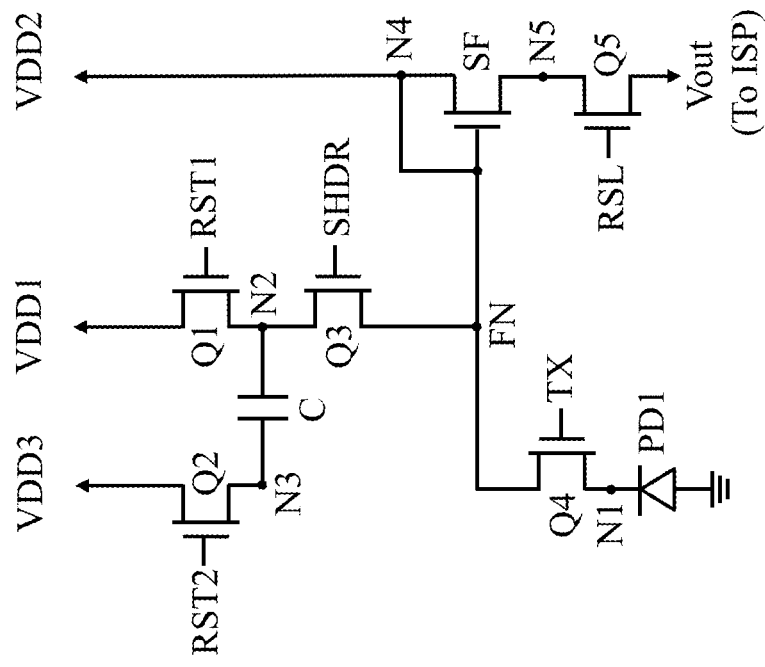
FIG. 1 is a schematic diagram of a pixel circuit in accordance with an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features can be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "over," "upper," "on" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Further, it will be understood that when an element is referred to as being "connected to" or "coupled to" another element, it can be directly connected to or coupled to the other element, or intervening elements can be present.

Embodiments, or examples, illustrated in the drawings are disclosed as follows using specific language. It will nevertheless be understood that the embodiments and examples are not intended to be limiting. Any alterations or modifications in the disclosed embodiments, and any further applications of the principles disclosed in this document are contemplated as would normally occur to one of ordinary skill in the pertinent art.

Further, it is understood that several processing steps and/or features of a device can be only briefly described. Also, additional processing steps and/or features can be added, and certain of the following processing steps and/or features can be removed or changed while still implementing the claims. Thus, it is understood that the following descriptions represent examples only, and are not intended to suggest that one or more steps or features are required.

In addition, the present disclosure may repeat reference numerals and/or letters in the various examples. This repetition is for the purpose of simplicity and clarity and does not in itself dictate a relationship between the various embodiments and/or configurations discussed.

FIG. 1 is a schematic diagram of a pixel circuit in accordance with an embodiment of the present disclosure.

In some embodiments, the pixel circuit 100 may be a high-dynamic range (HDR) complementary metal oxide semiconductor (CMOS) pixel circuit that is integrated into a CMOS image sensor within a stack CIS structure. This structure may include a plurality of dies arranged in the stack CIS structure. The dies may include one or more system-on-chip (SoC) dies and one or more application-specific integrated circuit (ASIC) dies. The pixel circuit 100 may be formed on one of the dies at the top of the stacked structure, but the present disclosure is not limited thereto. Details about the stack CIS structure will be described later.

In some embodiments, the pixel circuit 100 may be a 6-transistor (6T) active pixel circuit, which include transistors Q1 to Q5 and SF, a photodetector PD1, and a capacitor C, as depicted in FIG. 1. Transistors Q1 to Q5 may be controlled by control signals RST1, RST2, SHDR, TX, and RSL, respectively. For example, the control signal RST1 may be a global reset signal for resetting the CMOS pixel circuit 100. The control signal RST2 may be a reset signal for resetting the capacitor C. The control signal SHDR may be configured to control the pixel circuit 100 to switch between SDR and HDR sensing mode. The control signal TX may be used to control transistor Q4 which may be a transfer gate of the photodetector PD1 (e.g., a photodiode). The control signal RSL may be used to control transistor Q5 coupled to a read sensing line providing a sensed pixel value of the pixel circuit 100 to an image-signal processor (ISP).

In some embodiments, the capacitor C may be a three-dimensional metal-insulator-metal (3D MIM) lateral overflow integrated capacitor (LOFIC) coupled between nodes N2 and N3, and configured to store electric charges overflowed from the photodetector PD1 in a high illuminance scene. In some embodiments, the capacitor C may be formed between the topmost metal layer (e.g., TM1) and the second topmost metal layer (e.g., TM2) of the topmost die (e.g., an SoC die) within the stack CIS structure.

In some embodiments, the photodetector PD1 may include an anode electrically connected to a reference voltage (e.g., a ground voltage) and a cathode electrically connected to node N1. Transistor Q4 may be a transfer gate which includes a first terminal electrically connected to floating node FN and a second terminal electrically connected to node N1. Transistor Q1 may be a global reset switch which includes a first terminal electrically connected to a first power supply voltage VDD1 and a second terminal electrically connected to node N2. Transistor Q2 may be a capacitor-reset switch which includes a first terminal electrically connected to a third power supply voltage VDD3 and a second terminal electrically connected to node N3. Transistor Q3 may be a mode-selection switch which includes a first terminal electrically connected to node N2 and a second terminal electrically connected to floating node FN. Additionally, the first power supply voltage VDD1 is higher than the third power supply voltage VDD3 since the global reset operation may require a higher voltage than the capacitor-reset operation.

In some embodiments, transistor SF may be a source follower transistor which includes a gate electrically connected to floating node FN, a drain electrically connected node N4, and a source electrically connected to node N5. Additionally, transistor SF may be a source follower with the gate and drain of transistor SF being electrically connected. In some embodiments, the gate of transistor SF may not be connected to its drain. Transistor Q5 may be a row-selection switch which includes a first terminal electrically connected to node N5 and a second terminal providing an output voltage Vout of the pixel circuit 100.

FIGS. 2A to 2E are schematic diagrams illustrating operations of the pixel circuit in FIG. 1.

Figure 2B:
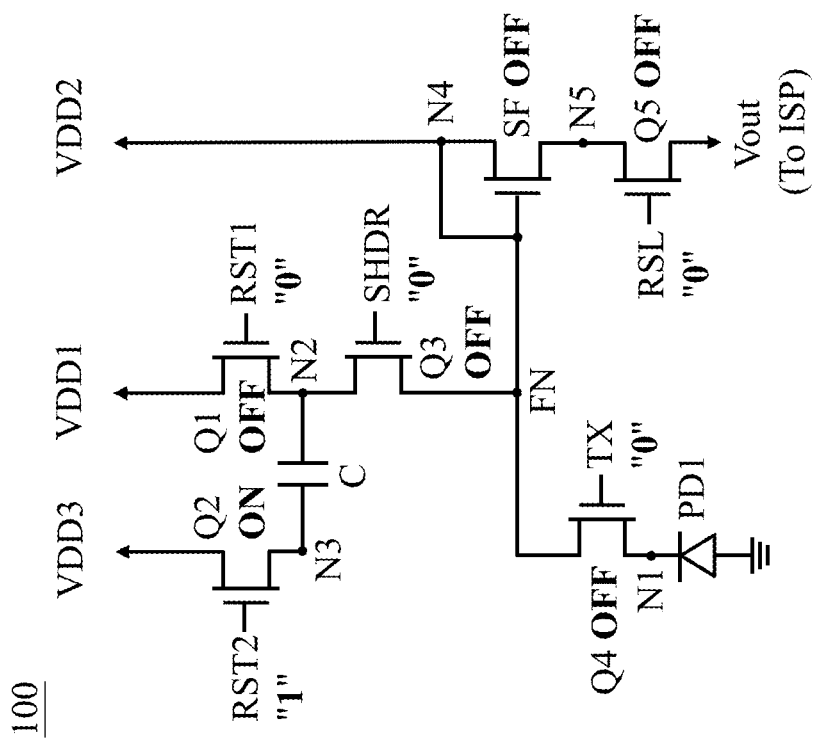
Figure 2A:
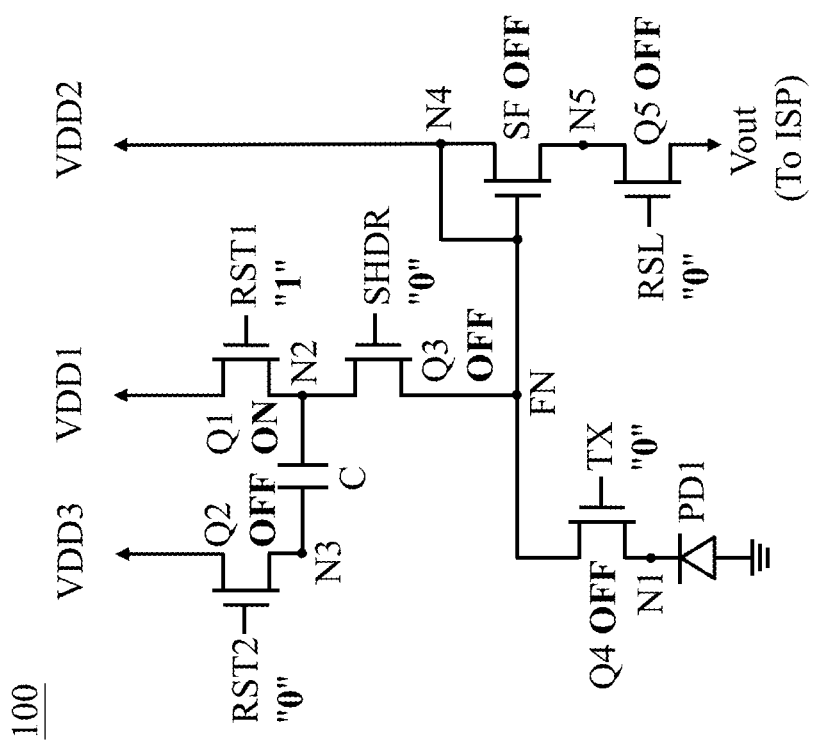

In some embodiments, before the pixel circuit 100 starts to detect the voltage level corresponding to the illuminance of the incident light of the pixel circuit 100, an initialization procedure may be performed. The initialization procedure may include a global reset operation and a capacitor reset operation. For example, as depicted in FIG. 2A, the control signal RST1 is asserted (e.g., logic "1") while the remaining control signals RST2, SHDR, TX, and RSL are de-asserted (e.g., logic "0"). At this time, transistor Q1 is turned on, and transistors Q2 to Q5 are turned off. Transistor SF may be turned off since its output path through the source (e.g., node N5) of transistor SF is cut off by transistor Q5. This allows the global reset operation of the pixel circuit 100. It should be noted that some electric charges may be overflowed from photodetector PD1 to floating node FN through transistor Q4 (e.g., a transfer gate of photodetector PD1), and these electric charges will not transferred to the capacitor C through transistor Q3 which is turned off. In some embodiments, a portion of the electric charges stored in the capacitor C may be discharged by the global reset operation.

Upon the global reset operation being completed, the capacitor-reset operation may start. For example, as depicted in FIG. 2B, the control signal RST2 is asserted (e.g., logic "1" while the remaining control signals RST1, SHDR, TX, and RSL are de-asserted (e.g., logic "0"). At this time, transistor Q2 is turned on, and transistors Q1 and Q3 to Q5 are turned off. Transistor SF may be turned off since its output path through the source (e.g., node N5) of transistor SF is cut off by transistor Q5. This allows the capacitor reset operation of the pixel circuit 100, and the electric charges (or the remaining electric charges) stored in the capacitor C may be discharged by the capacitor reset operation.

Upon the capacitor reset operation being completed, the pixel circuit 100 may start to sense the voltage level corresponding to the illuminance of the incident light. For example, as depicted in FIG. 2C, the control signal SHDR is asserted (e.g., logic "1") while the remaining control signals RST1, RST2, TX, and RSL are de-asserted (e.g., logic "0"). At this time, transistor Q3 is turned on, and transistors Q1, Q2, Q4, and Q5 are turned off. Transistor SF may be turned off since its output path through the source (e.g., node N5) of transistor SF is cut off by transistor Q5. This allows the electric charges, which are overflowed in an overflow current from photodetector PD1 through transistor Q4, at floating node FN to be stored in the capacitor C through transistor Q3 along path 202 (e.g., a current leakage path).

Subsequently, in response to the capacitor C being fully charged, a first read operation may be performed to read the voltage level detected by the photodetector PD1. For example, as depicted in FIG. 2D, the control signals TX and RSL are asserted (e.g., logic "1") while the remaining control signals RST1, RST2, and SHDR are de-asserted (e.g., logic "0"). At this time, transistor Q4 and Q5 are turned on, and transistors Q1 to Q3 are turned off. Since transistor Q5 is turned on, the output path of transistor SF is conducted, and transistor SF is also turned on. Accordingly, the voltage level detected by the photodetector PD1 can be transferred to the source of transistor Q5 along path 204 (e.g. a current path) through transistors Q4, SF, and Q5, and the output voltage Vout can be read by the subsequent image-signal processor.

Figure 2E:
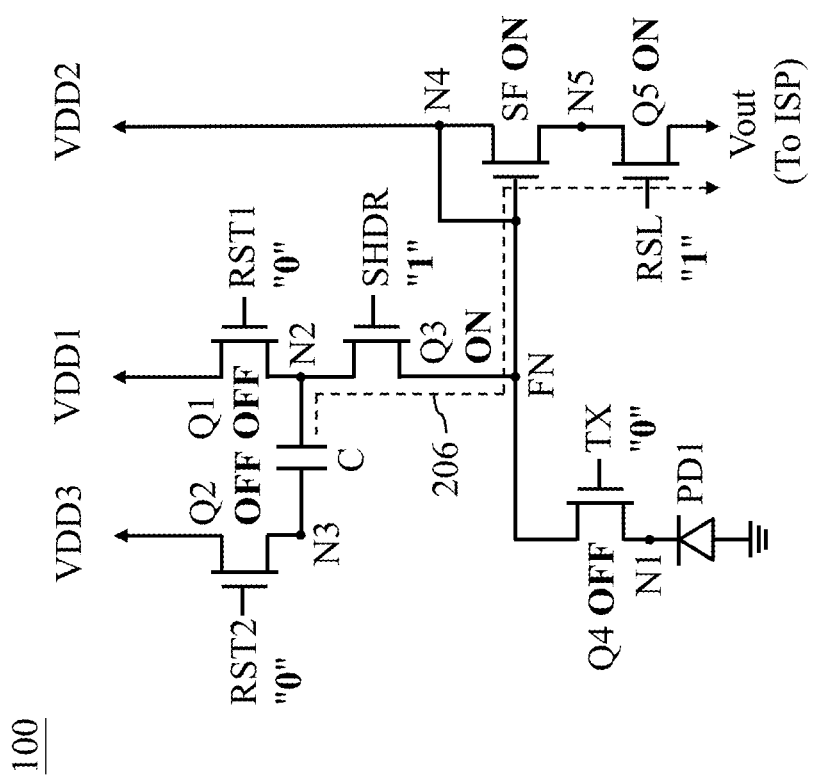

Additionally, after the output voltage Vout of the first read operation being read, a second read operation may be performed to read the voltage associated with the electric charges stored in the capacitor C. For example, as depicted in FIG. 2E, the control signals SHDR and RSL are asserted (e.g., logic "1") while the remaining control signals RST1, RST2, and TX are de-asserted (e.g., logic "0"). At this time, transistor Q3 and Q5 are turned on, and transistor Q1, Q2, and Q4 are turned off. Since transistor Q5 is turned on, the output path of transistor SF is conducted, and transistor SF is also turned on. Accordingly, the voltage associated with the electric charges stored in the capacitor C can be transferred to the source of transistor Q5 along path 206 (e.g. a current path) from capacitor C through transistors Q3, SF, and Q5, and the output voltage Vout can be read by the subsequent image-signal processor.

It should be noted that the two output voltage Vout read by the subsequent image-signal processor in FIGS. 2D-2E can be used to obtain a high-dynamic range (HDR) pixel value. Additionally, with the technique of the 3D MIM LOFIC, the capacitor C can store more electric charges than existing techniques of integrated capacitors, thereby improving the dynamic range of the output HDR pixel value.

Figure 3:
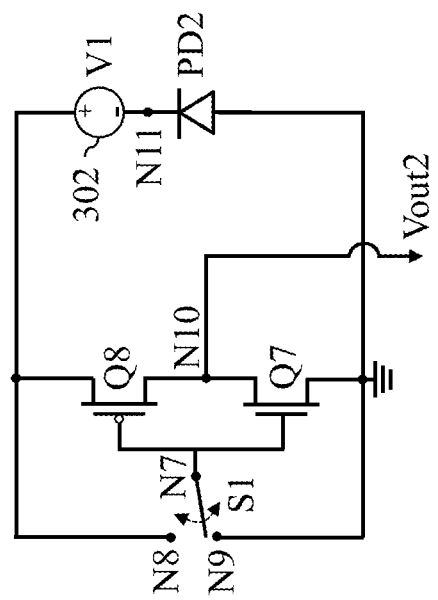
FIG. 3 is a schematic diagram of a light-responsive switch circuit in accordance with an embodiment of the present disclosure.
Figure 4B:
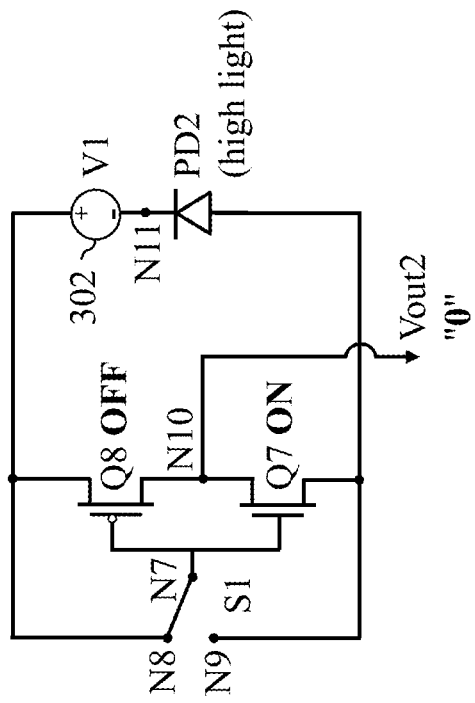
FIGS. 4A-4B are schematic diagram illustrating operations of the light-responsive switch circuit in FIG. 3.
Figure 4A:
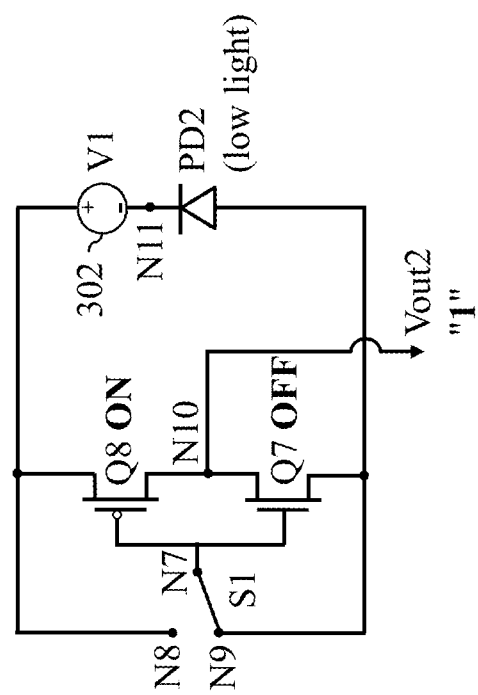

FIG. 3 is a schematic diagram of a light-responsive switch circuit in accordance with an embodiment of the present disclosure. FIGS. 4A-4B are schematic diagram illustrating operations of the light-responsive switch circuit in FIG. 3.

In some embodiments, the light-responsive switch circuit 300 may be configured to provide an output voltage Vout2 switching between a high voltage (e.g., VDD2) and a low voltage (e.g., a ground voltage) based on the light luminance of the received incident light. As depicted in FIG. 3, the light-responsive switch circuit 300 may include transistors Q7 and Q8, a photodetector PD2, a voltage source 302, and a switch S1. The voltage source V1 may be coupled between nodes N8 and N11. The photodetector PD2 may be a photodiode coupled between node N11 and the ground. Transistor Q7 may have a control terminal electrically connected to node N7, a first terminal electrically connected to node N10, and a second terminal electrically connected to the ground. Transistor Q8 may have a control terminal electrically connected to node N7, a first terminal electrically connected to node N8, and a second terminal electrically connected node N10.

In some embodiments, the switch S1 may be controlled by the photodetector PD2 depending on the illuminance of the light received by the photodetector PD2. The switch S1 may have a first terminal electrically connected to node N7, and a second terminal switching between nodes N8 and N9. Additionally, node N10 may be an output port of the light-responsive switch circuit 300. In some embodiments, transistor Q7 may be omitted from the light-responsive switch circuit 300. In some embodiments, node N9 may be electrically connected to the ground.

Referring to FIG. 4A, in conditions of low-light illuminance, the light-responsive switch circuit 300 operates by switching the switch S1 to connect nodes N7 and N9. Consequently, the control terminal (e.g., node N7) of transistor Q8 may be electrically connected to the ground, causing transistor Q8 to turn on and transistor Q7 to turn off. Accordingly, the voltage V1 of the voltage source 302 can be transferred to the output port (e.g., N10) of the light-responsive switch circuit 300 through transistor Q8, resulting in the output voltage Vout2 in the high voltage (e.g., logic "1").

Similarly, in conditions of high-light illuminance, the light-responsive switch circuit 300 operates by switching the switch S1 to connect nodes N7 and N8. Consequently, the control terminal (e.g., node N7) of transistor Q7 may be electrically connected to the voltage source 302, causing transistor Q8 to turn off and transistor Q7 to turn on. Accordingly, the output voltage Vout2 at the output port (e.g., node N10) of the light-responsive switch circuit 300 may be pulled down to the ground voltage through transistor Q7, resulting in the output voltage Vout2 in the ground voltage (e.g., logic "0"). In some embodiments, transistor Q7 is omitted from the light-responsive switch circuit 300, in conditions of high-light illuminance, the light-responsive switch circuit 300 operates by switching the switch S1 to connect nodes N7 and N8. Since transistor Q8 is turned off, the output port (e.g., node N10) of the light-responsive switch circuit 300 may be floating, and no output voltage Vout2 is provided.

Figure 5A:
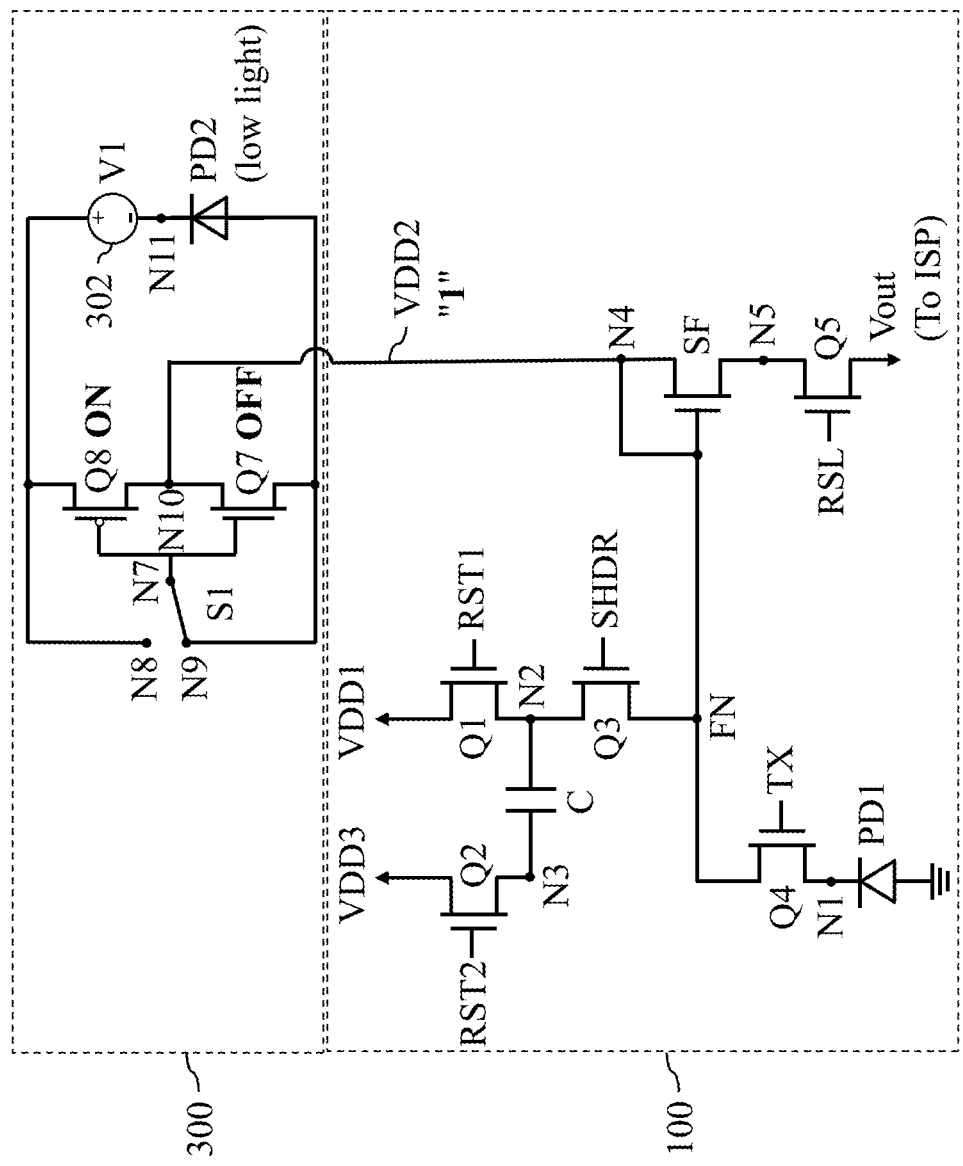
FIGS. 5A-5B are schematic diagrams illustrating operations of a pixel circuit in accordance with another embodiment of the present disclosure.
Figure 5B:
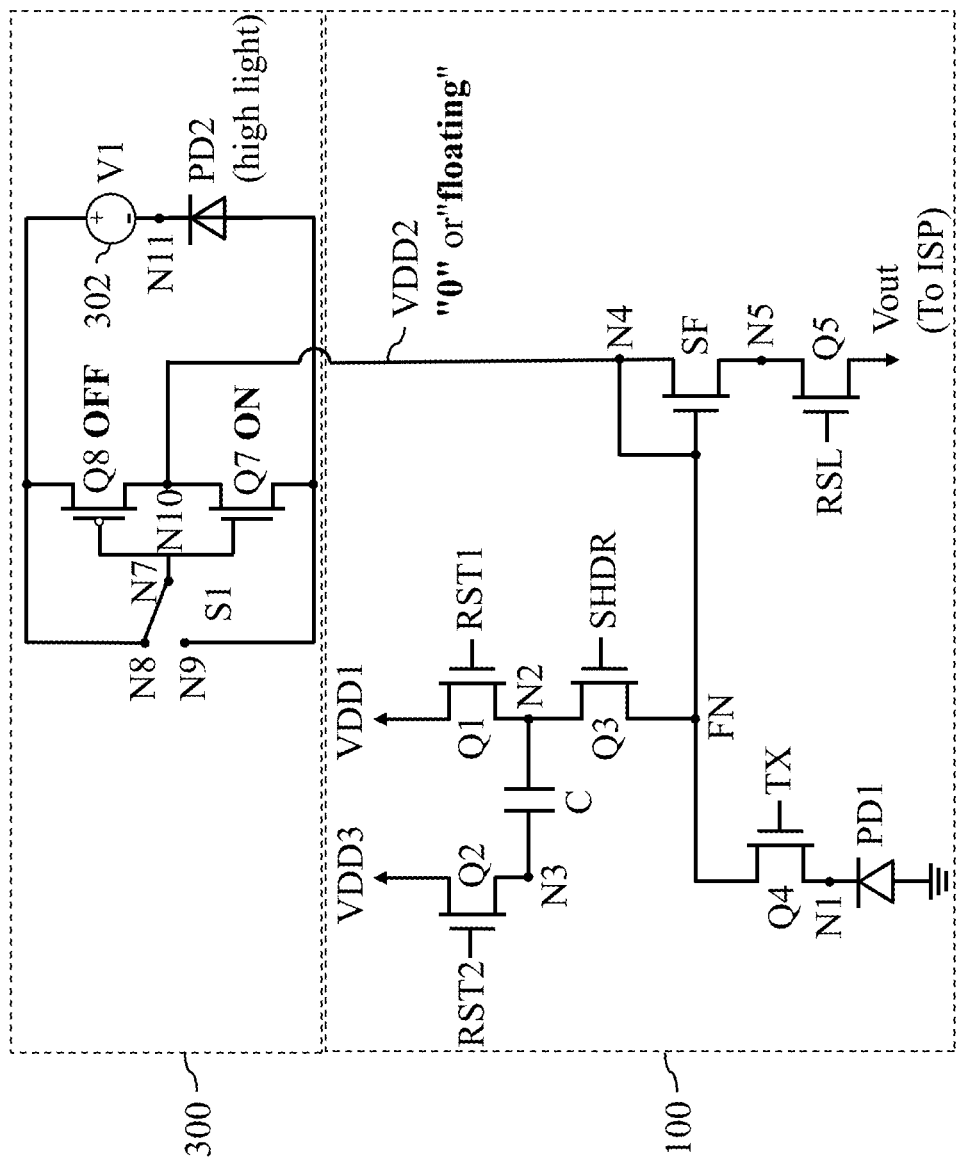

FIGS. 5A-5B are schematic diagrams illustrating operations of a pixel circuit in accordance with another embodiment of the present disclosure. Please refer to FIGS. 1, 3, and 5.

In some embodiments, the pixel circuit 500 shown in FIGS. 5A and 5B may include the pixel circuit shown in FIG. 1 and the light-responsive switch circuit 300 shown in FIG. 3. For example, the light-responsive switch circuit 300 can be used to provide a second power supply voltage VDD2 of different voltages to the pixel circuit 100 in a high-light illuminance and a low-light illuminance, respectively, as depicted in FIGS. 5A and 5B.

Referring to FIG. 5A, in conditions of low-light illuminance, the light-responsive switch circuit 300 operates by switching the switch S1 to connect nodes N7 and N9. Consequently, the control terminal (e.g., node N7) of transistor Q8 may be electrically connected to the ground, causing transistor Q8 to turn on and transistor Q7 to turn off. Accordingly, the voltage V1 of the voltage source 302 can be transferred to the output port (e.g., N10) of the light-responsive switch circuit 300 through transistor Q8, and the output voltage Vout2 in the high voltage (e.g., logic "1") at node N10 can be served as the second power supply voltage VDD2 of the pixel circuit 100. Moreover, the aforementioned high voltage of the output voltage Vout2 may be substantially equal to the voltage V1 plus the output voltage of the photodetector PD2. In some embodiments, the output voltage of the photodetector PD2 can be neglected in conditions of very low-light illuminance.

Similarly, in conditions of high-light illuminance, the light-responsive switch circuit 300 operates by switching the switch S1 to connect nodes N7 and N8. Consequently, the control terminal (e.g., node N7) of transistor Q7 may be electrically connected to the voltage source 302, causing transistor Q8 to turn off and transistor Q7 to turn on. Accordingly, the output voltage Vout2 at the output port (e.g., node N10) of the light-responsive switch circuit 300 may be pulled down to the ground voltage through transistor Q7, and the output voltage Vout2 in the ground voltage (e.g., logic "0") at node N10 can be served as the second power supply voltage VDD2 of the pixel circuit 100. When the second power supply voltage VDD2 is equal to the ground voltage, transistor SF is turned off.

It should be noted that the operations of the pixel circuit 100 may depend on the control signals RST1, RST2, SHDR, TX, and RSL in addition to the second power supply voltage VDD2 being in the high voltage or the ground voltage. Specifically, since the gate of transistor SF is connected to its drain, when the second power supply voltage is in the high voltage, the state of transistor SF (e.g., a source follower) may depend on whether the output path at its source (e.g., node N5) is cut off by transistor Q5.

In some embodiments, in conditions of low-light illuminance, the output voltage of the photodetector PD1 may be lower than the threshold voltage (e.g., 0.5V to 0.7V) of transistor SF, so the transistor SF cannot be turned on using the output voltage of the photodetector PD1. Additionally, the light-responsive switch circuit 300 can function as a low-light switch which can provide the second power supply voltage VDD2 in the high voltage to the floating node FN and node N4 in conditions of low-light illuminance, causing transistor SF to turn on. Therefore, the operations of the pixel circuit 500 shown in FIG. 5 may be similar to those described in the embodiments of FIGS. 2A to 2E.

Similarly, in conditions of high-light illuminance, the output voltage of the photodetector PD1 may be higher than the threshold voltage of transistor SF, so the transistor SF can be turned on using the output voltage of the photodetector PD1. Additionally, the light-responsive switch circuit 300 can function as a high-light switch which can provide no voltage potential to the floating node FN and node N4. Therefore, the operations of the pixel circuit 500 shown in FIG. 5 may be similar to those described in the embodiments of FIGS. 2A to 2E.

In some embodiments, the photodetectors PD1 and PD2 can be implemented using the same photodetector PD, and the control signal of switch S1 may depend on the logic state of the output voltage of the photodetector PD. For example, when the output voltage of the photodetector PD is in the low logic state, switch S1 may be switched to connect nodes N7 and N9. When the output voltage of the photodetector PD is in the high logic state, switch S1 may be switched to connect nodes N7 and N8.

FIGS. 6A-6D are cross sections of a capacitor unit in accordance with different embodiments of the present disclosure.

Figure 6A:
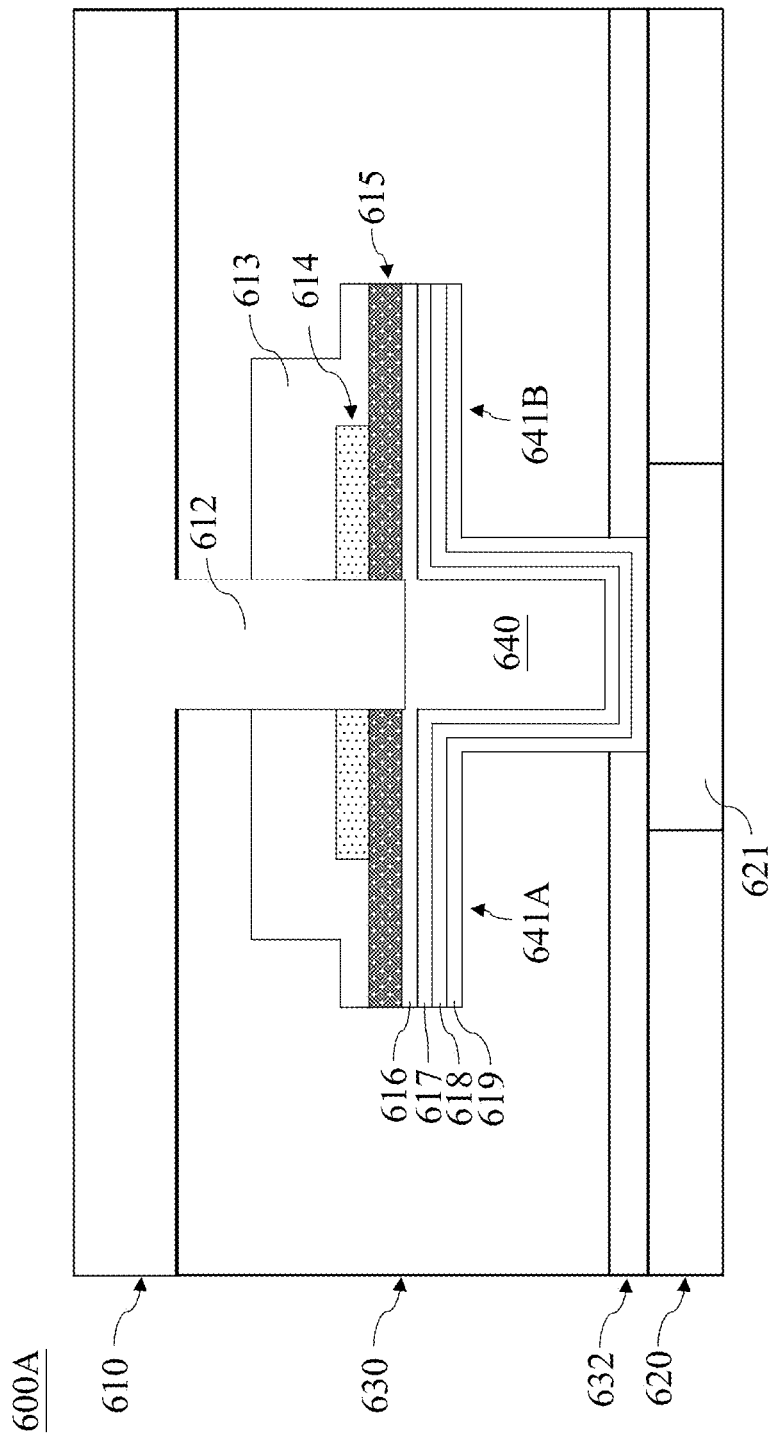
FIGS. 6A-6D are cross sections of a capacitor unit in accordance with different embodiments of the present disclosure.

In some embodiments, the capacitor C shown in FIG. 5 may be a LOFIC 3D-MIM capacitor which includes one or more capacitor units. Each capacitor unit can be implemented using the capacitor unit 600A shown in FIG. 6A. As depicted in FIG. 6A, the capacitor unit 600A may be formed within a dielectric layer 630 between a first conductive layer 610 and a second conductive layer 620. In some embodiments, each of the first conductive layer 610 and the second conductive layer 620 may be a metal layer such as gold (Au), silver (Ag), aluminum (Al), nickel (Ni), palladium (Pd), copper (Cu) or alloys thereof. The dielectric layers 630 and 632 may be or comprise, for example, silicon dioxide, silicon oxynitride, a low-K dielectric, silicon carbide, silicon nitride, some other dielectric, or any combination of the foregoing. In some embodiments, the dielectric layer 632 may be part of the dielectric layer 630.

As depicted in FIG. 6A, a plurality of layers 616, 617, 618, and 619 are formed as a stack, and are formed as blanket layers. Layer 66 may be a conductive layer formed of TiN. Dielectric layer 617 may be a high-k dielectric layer formed of stacked layers $ZrO_2/AL_2O_3/ZrO_2$ (ZAZ). ZAZ may have the advantageous feature of having a low equivalent oxide thickness, and hence the capacitance value of the resulting capacitor is high. Layer 618 may be a conductive layer formed of TiN having substantially the same thickness as layer 616. Layer 619 may be a liner layer that blocks material of the layer 618 from migrating to surrounding structure. Layer 619 may be a bottom electrode of the capacitor unit 600A connected to a conductive contact 621 of the second conductive layer 620. Layer 619 may be or include, for example, titanium, tantalum, titanium nitride, tantalum nitride, or some other barrier material for layer 618. Stacked layers 616 to 619 may form recess 640. In some embodiments, layers 616 and 617 may be patterned in a photolithography process to form a top electrode of the capacitor unit 600A.

In some embodiments, layers 613, 614, and 615 may form a stack on layer 616. Layer 615 may be a protection layer or an anti-reflective coating formed of SiON (silicon oxynitride). Layers 613 and 614 may be dielectric layers that may be or include may be or comprise, for example, silicon dioxide, a low-K dielectric, silicon carbide, silicon nitride, some other dielectric, or any combination of the foregoing. In some embodiments, layers 613 and 614 may include different dielectric materials. In some embodiments, layers 613 and 614 may include the same dielectric materials. It should be noted that a top via 612 may penetrate from the first conductive layer 610 to layer 616 through layers 613, 614, and 615, thereby connecting layer 616 (e.g., top electrode of the capacitor unit 600A) to the first conductive layer 610. Additionally, the dielectric layer 613 may be in contact with portions of layer 615.

In some embodiments, the capacitor unit 600A may be a gull-wing shaped 3D-MIM capacitor with a wing root and two wings 641A and 641B. The wing root of the capacitor unit 600A may refer to recess 640. In some embodiments, a LOFIC 3D-MIM capacitor (e.g., capacitor C of the pixel circuit 500 in FIGS. 5A-5B) can be implemented using a single capacitor unit 600A or a plurality of capacitor units 600A connected in series side by side. When a plurality of capacitor units 600A are used, the resulting LOFIC 3D-MIM capacitor can have a greater capacitance. It should be noted that the cross section shown in FIG. 6A may be vertically flipped when a first die, on which the capacitor unit(s) 600A is formed, is flipped (e.g., upside down) to stack on a second die in a stacked CIS structure, and the capacitor unit 600A can be reverse gull-wing shaped.

Figure 6B:
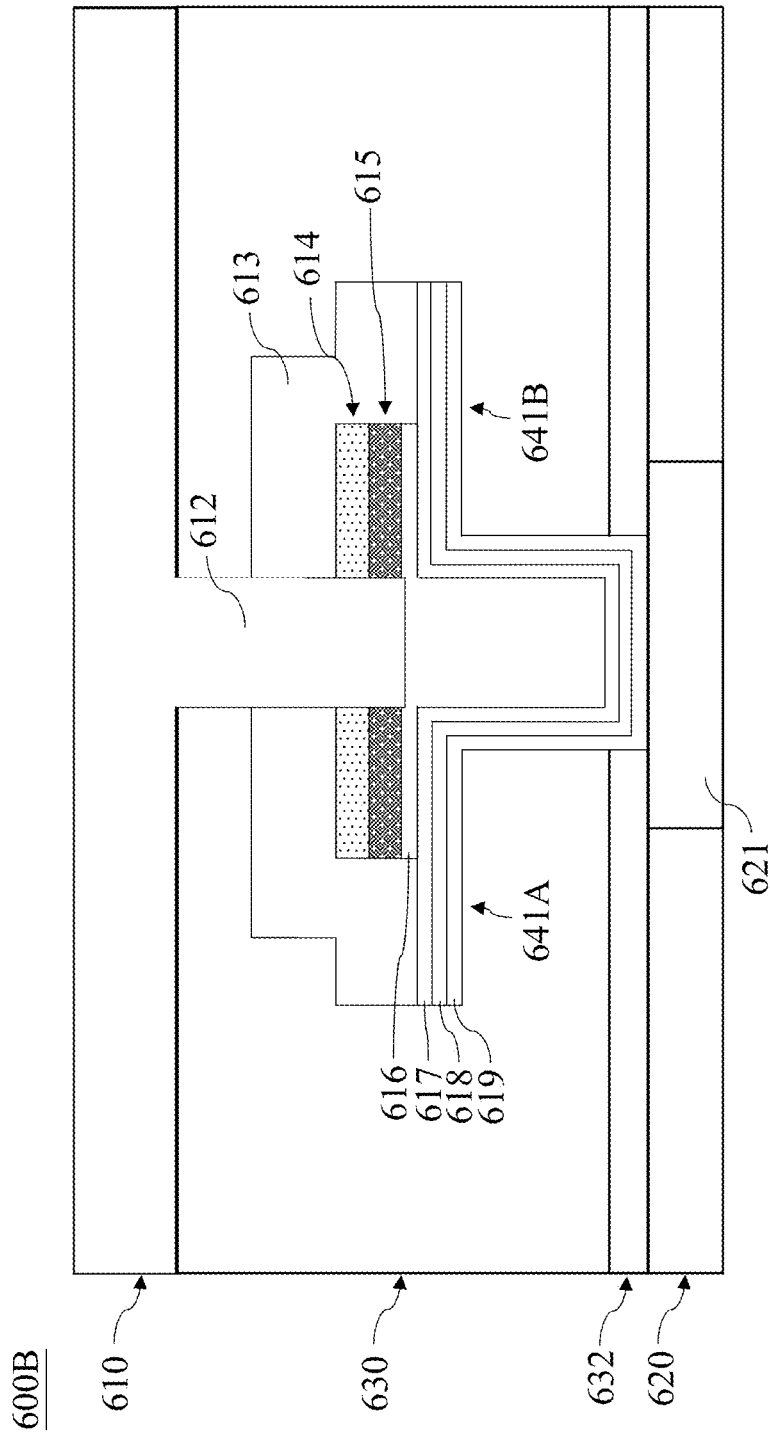

Referring to FIG. 6B, the capacitor unit 600B shown in FIG. 6B may be similar to the capacitor unit 600A shown in FIG. 6A, with the difference being that the dielectric layer 613 of the capacitor unit 600B can be in contact with portions of layer 616, and the lateral surfaces of layers 614 and 615 may be substantially aligned.

Figure 6C:
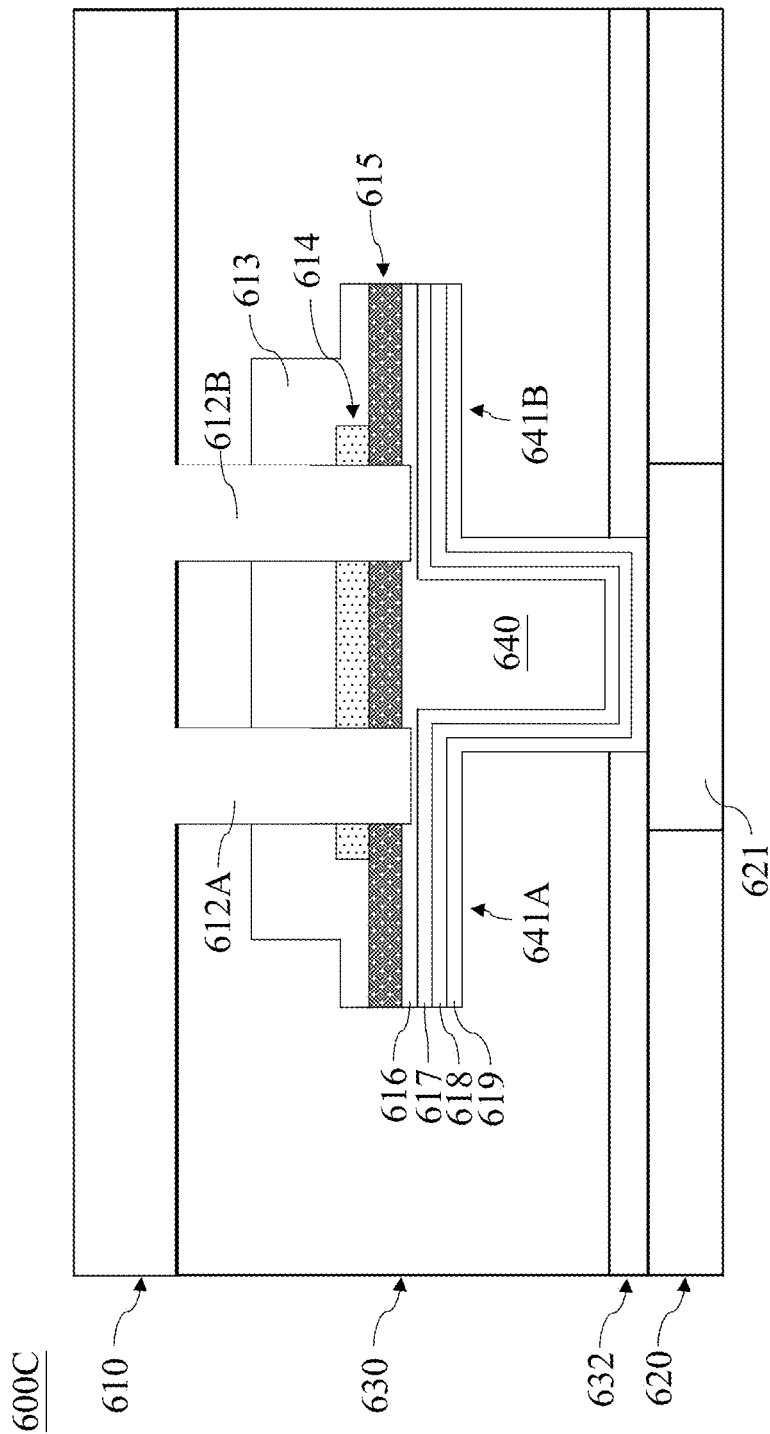

Referring to FIG. 6C, the capacitor unit 600C shown in FIG. 6C may be similar to the capacitor unit 600A shown in FIG. 6A, with the difference being that the two top vias 612A and 612B may penetrate from the first conductive layer 610 to layer 616 through layers 613, 614, and 615, thereby connecting layer 616 (e.g., top electrode of the capacitor unit 600A) to the first conductive layer 610.

Figure 6D:
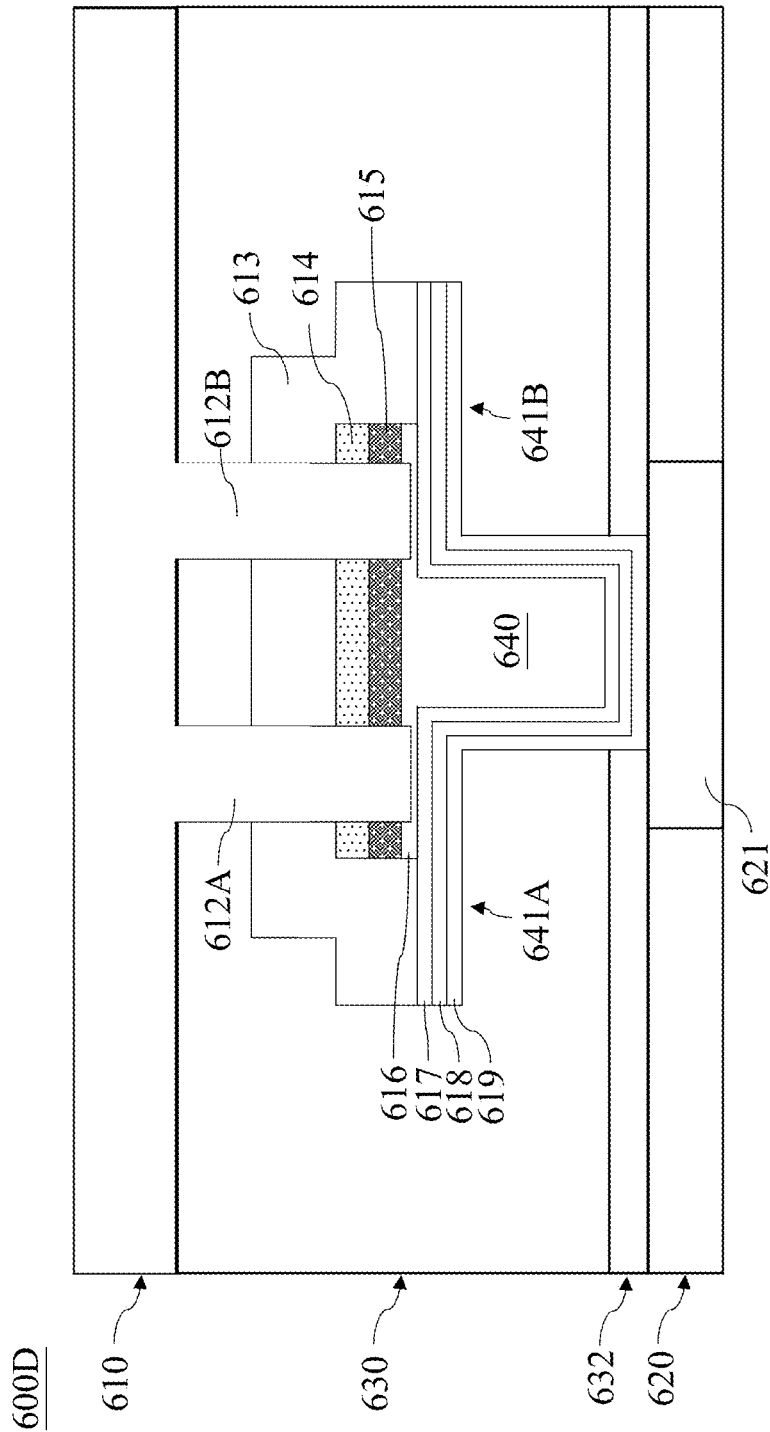

Referring to FIG. 6D, the capacitor unit 600D shown in FIG. 6D may be similar to the capacitor unit 600C shown in FIG. 6C, with the difference being that the dielectric layer 613 of the capacitor unit 600B can be in contact with portions of layer 616, and the lateral surfaces of layers 614 and 615 may be substantially aligned.

Figure 7A:
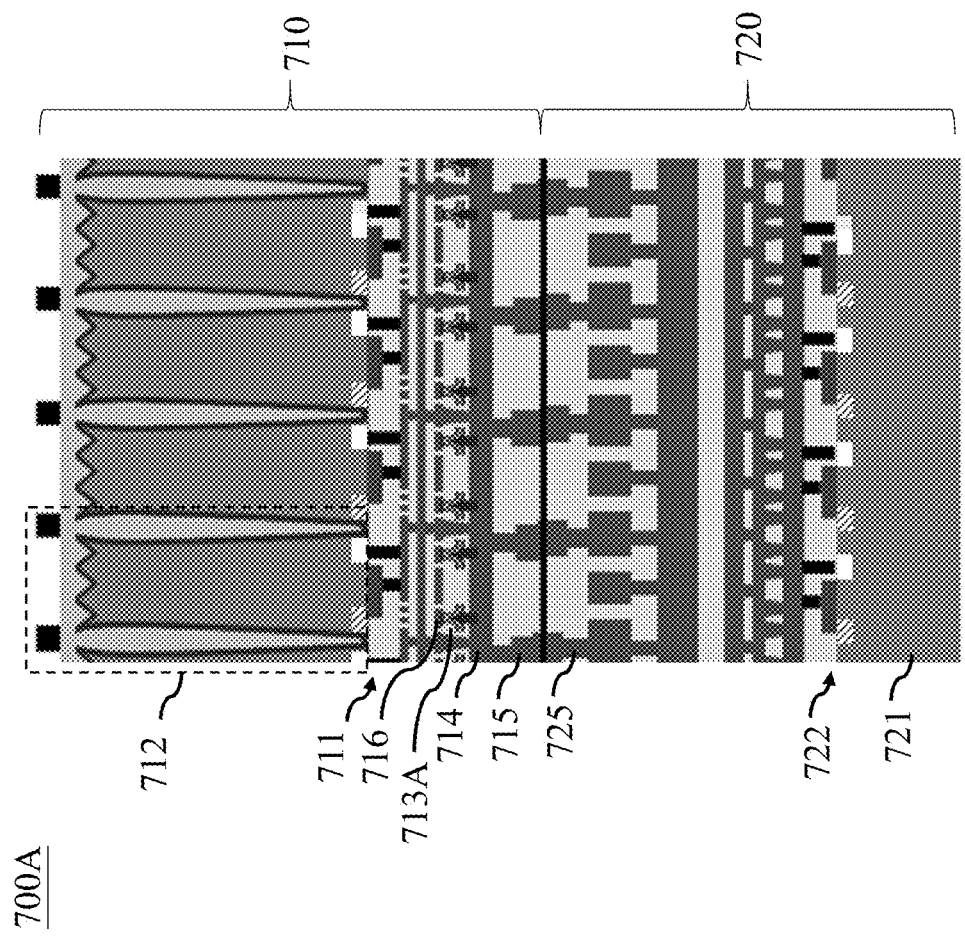
FIGS. 7A-7C are cross sections of a stacked CIS structure in accordance with different embodiments of the present disclosure.
Figure 7B:
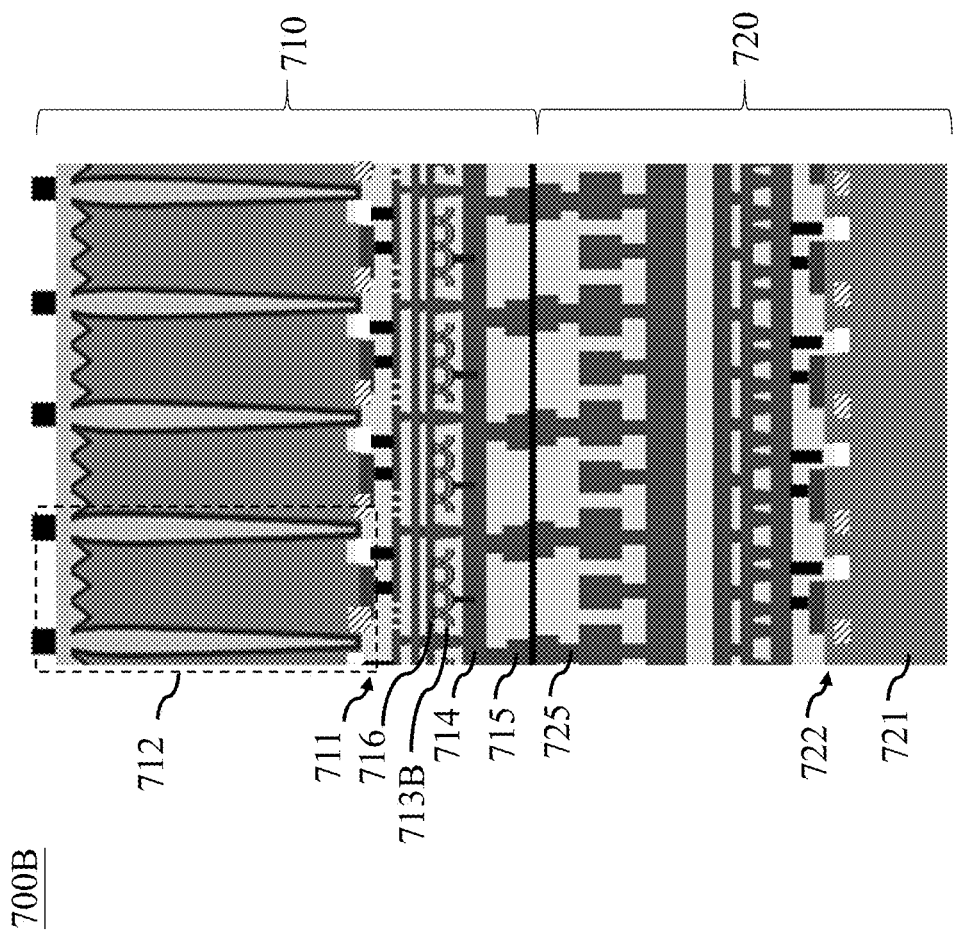
Figure 7C:
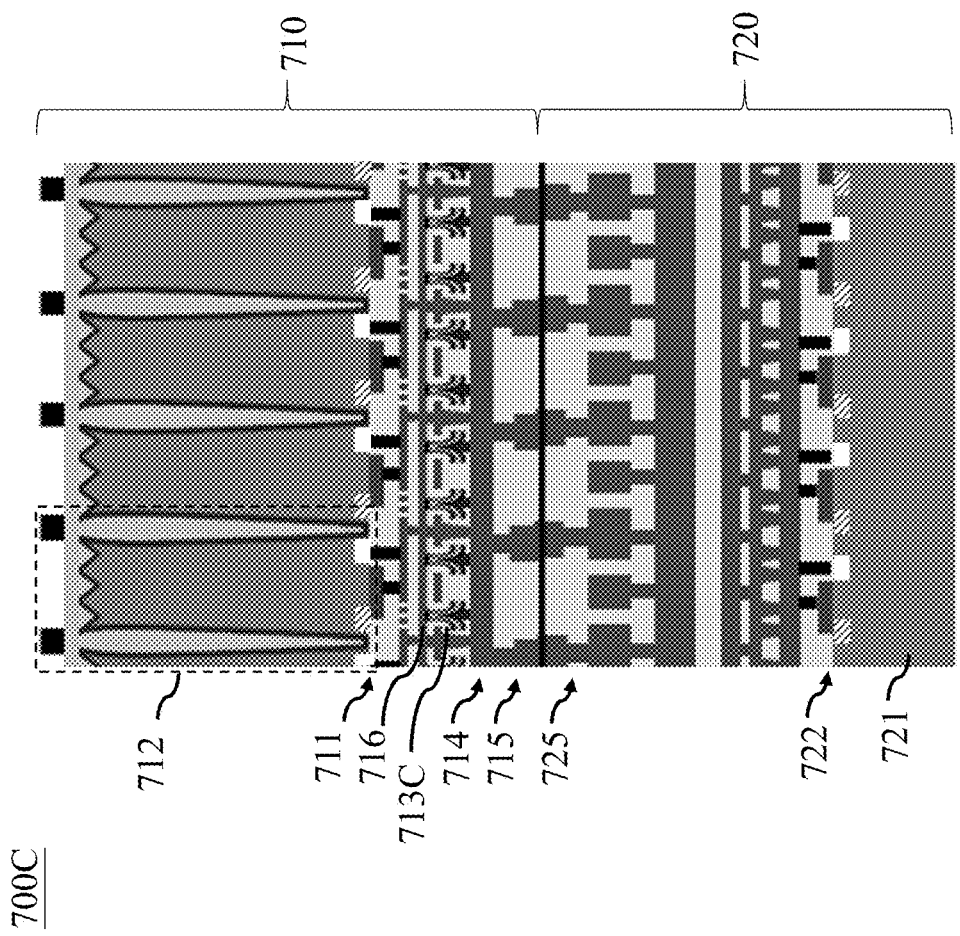

FIGS. 7A-7C are cross sections of a stacked CIS structure in accordance with different embodiments of the present disclosure.

In some embodiments, the stacked CIS structure 700A shown in FIG. 7A may include a first die 710 and a second die 720. The first die 710 may be stacked on the second die 720, with first die 710 being flipped. In some embodiments, the first die 710 may be a system-on-chip (SoC) on which a plurality of pixel circuits (e.g., pixel circuit 500 shown in FIGS. 5A and 5B) is disposed, where each pixel circuit may include one or more photodetectors 712, a circuit layer 711, and a capacitor 713A, as depicted in FIG. 7A. The second die 720 may be an ASIC including a substrate 721 on which an image-signal processor (e.g., logic circuitry 722) is disposed. The substrate 721 may be or include silicon (Si), germanium (Ge), and compound semiconductor materials such as gallium arsenide (GaAs), but the present disclosure is not limited thereto.

In some embodiments, the circuit layer 711 may include transistors that correspond to transistors Q1 to Q5, Q7-Q8, and SF of the pixel circuit 500 shown in FIGS. 5A and 5B. The photodetectors 712 may correspond to photodetectors PD1 and PD2 of the pixel circuit 500. The capacitor 713A may be a LOFIC 3D-MIM capacitor which is formed between conductive layers 714 and 716 of the first die 610, in one or more embodiments. In some embodiments, the conductive layer 714 may be a topmost metal layer of the first die 710, and the conductive layer 716 may be an intermediate metal layer or a second topmost metal layer of the first die 710.

In some embodiments, each capacitor 713A may be a LOFIC 3D-MIM capacitor with one gull-wing shaped capacitor unit, which is similar to the flipped capacitor unit 600A, 600B, 600C, or 600D shown in FIGS. 6A-6D. The photodetector 712 of each pixel circuit may be configured to detect the voltage level corresponding to the illuminance of the respective incident light. The voltage level detected by the photodetector 712 and the electric charges stored in the capacitor 713A can be transmitted to the logic circuitry 722 of the second die 720 through the distribution layer 715 of the first die 710 and the distribution layer 725 of the second die 720, the details of which can be referred to the embodiments of FIGS. 2A-2E and FIG. 5. It should be noted that there may be alignment shift between the front surfaces of the first die 710 and second die 720, such as alignment shift between the distribution layers 715 and 725.

In some embodiments, the stacked CIS structure 700B shown in FIG. 7B may be similar to the stacked CIS structure 700A shown in FIG. 7A, with the difference being that the capacitor 713B may include three gull-wing shaped capacitor units connected in series, each capacitor unit being similar to the flipped capacitor unit 600A, 600B, 600C, or 600D shown in FIGS. 6A-6D.

In some embodiments, the stacked CIS structure 700C shown in FIG. 7C may be similar to the stacked CIS structure 700A shown in FIG. 7A, with the difference being that the capacitor 713C may include one gull-wing shaped capacitor unit that has a high-k dielectric layer thicker than the flipped capacitor unit 600A, 600B, 600C, or 600D shown in FIGS. 6A-6D.

Figure 8A:
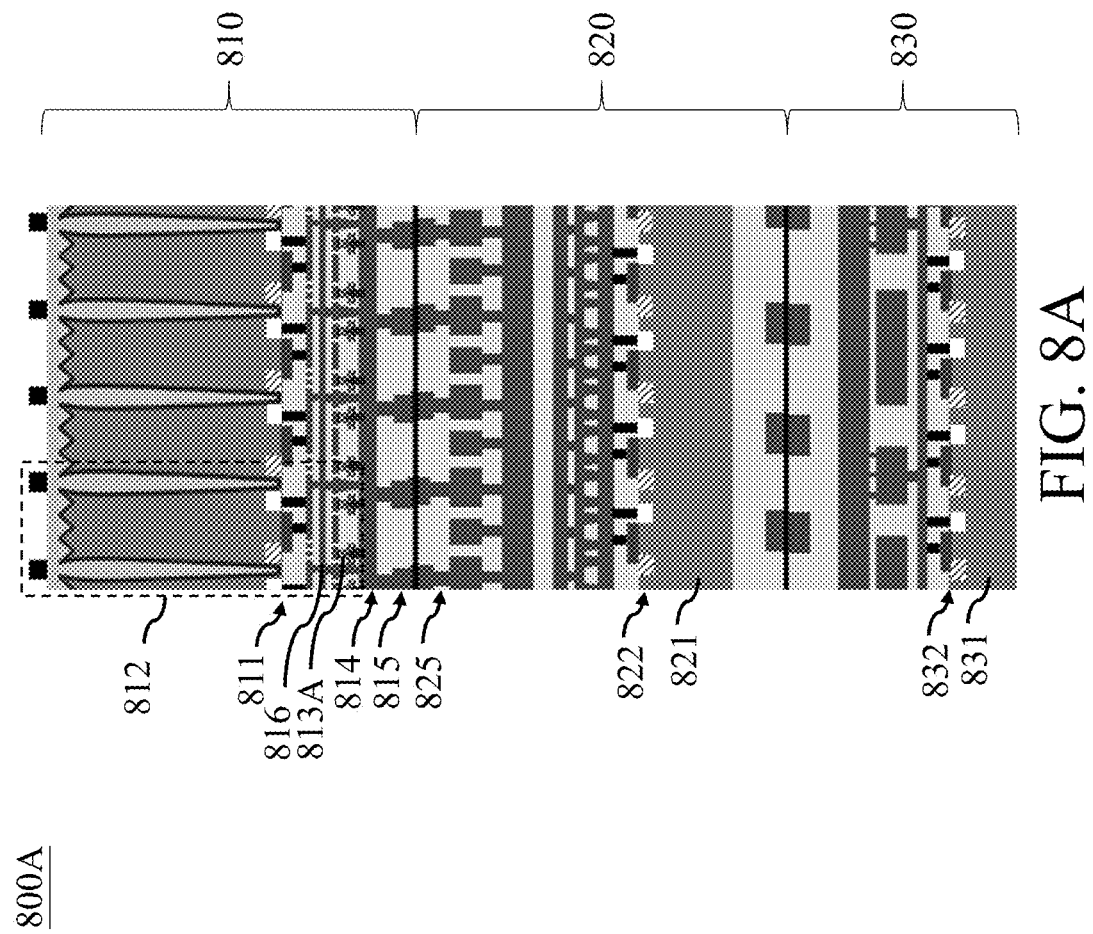
Figure 8C:
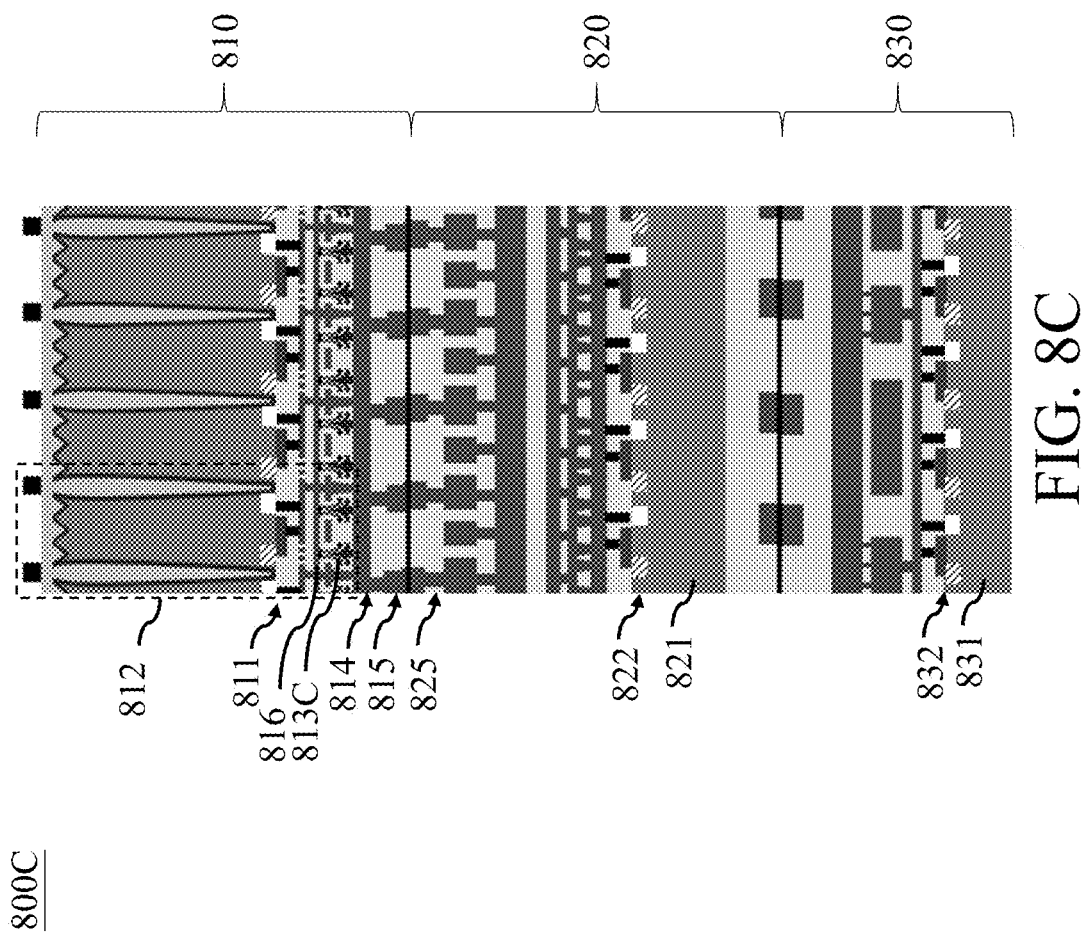

FIGS. 8A-8C are cross sections of a stacked CIS structure in accordance with different embodiments of the present disclosure.

In some embodiments, the stacked CIS structure 800A shown in FIG. 8A may include a first die 810, a second die 820, and a third die 830. The first die 810 may be stacked on the second die 820, with first die 810 being flipped. Additionally, the second die 820 may be stacked on the third die 830. The stack of the first die 810 and second die 820 may be similar to the stack CIS structure 700A shown in FIG. 7A, the details of which will not repeated here.

In some embodiments, the first die 810 may be a system-on-chip (e.g., SOC1) on which a plurality of pixel circuits (e.g., pixel circuit 500 shown in FIGS. 5A and 5B) is disposed. The second die 820 may be an SoC (e.g., SOC2) or an ASIC (e.g., ASIC1) including a substrate 821 on which part of the pixel circuits and/or part of an image-signal processor (e.g., logic circuitry 822) is disposed. The third die 830 may be another ASIC (e.g., ASIC2) including a substrate 831 on which part of the image-signal processor (e.g., logic circuitry 832) is disposed.

Specifically, each pixel circuit may include a first portion (e.g., photodetector 812, circuit layer 811, and capacitor 813A) on the first die 810, and a second portion (e.g., logic circuitry 822) on the second die 820. Additionally, the image-signal processor may include a first portion (e.g., part of logic circuitry 822) on the second die 820, and a second portion (e.g., logic circuitry 832) on the third die.

In some embodiments, the stacked CIS structure 800B shown in FIG. 8B may be similar to the stacked CIS structure 800A shown in FIG. 8A, with the difference being that the capacitor 813B may include three gull-wing shaped capacitor units connected in series, each capacitor unit being similar to the flipped capacitor unit 600A, 600B, 600C, or 600D shown in FIGS. 6A-6D.

In some embodiments, the stacked CIS structure 800C shown in FIG. 8C may be similar to the stacked CIS structure 800A shown in FIG. 8A, with the difference being that the capacitor 813C may include one gull-wing shaped capacitor unit that has a high-k dielectric layer thicker than the flipped capacitor unit 600A, 600B, 600C, or 600D shown in FIGS. 6A-6D.

Figure 9:
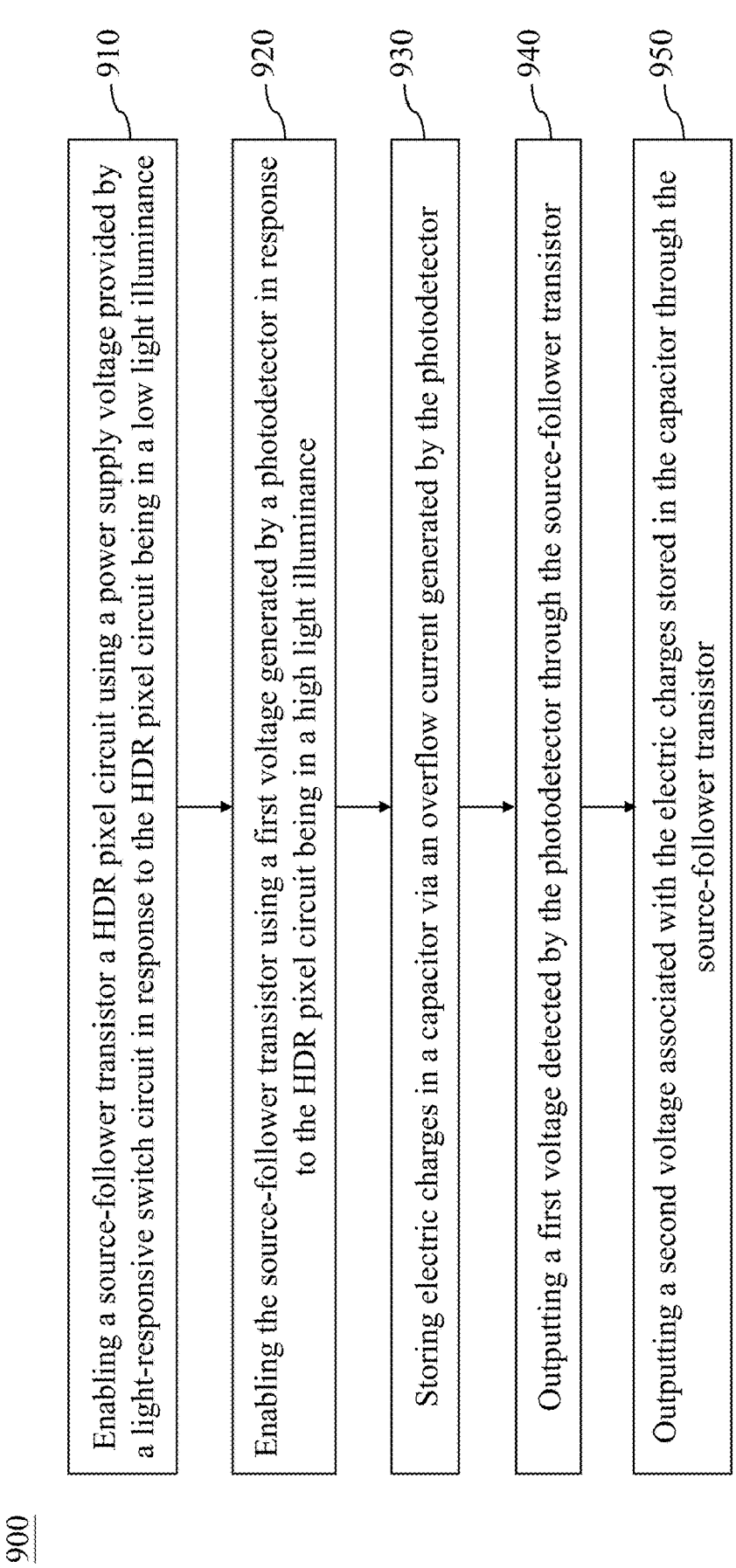
FIG. 9 is a method for operating a pixel circuit in accordance with an embodiment of the present disclosure.

FIG. 9 is a method for operating a pixel circuit in accordance with an embodiment of the present disclosure. Please refer to FIGS. 5A-5B and FIG. 9.

In operation 910, a source-follower transistor (e.g., transistor SF) of an HDR pixel circuit (e.g., pixel circuit 100) is enabled using a power supply voltage (e.g., VDD2) provided by a light-responsive switch circuit 300 in response to the HDR pixel circuit (e.g., pixel circuit 500) being in a low light illuminance. For example, when the pixel circuit 500 is in the low light illuminance, the voltage generated by the photodetector PD1 may be lower than the threshold voltage of transistor SF, resulting the source follower (i.e., transistor SF) being turned off. This will cause the pixel circuit 500 being unable to successfully detect the pixel value in the low-light illuminance.

In operation 920, the source-follower transistor (e.g., transistor SF) is enabled using a first voltage generated by a photodetector (e.g., photodetector PD1) in response to the HDR pixel circuit (e.g., pixel circuit 500) being in a high light illuminance. For example, when the pixel circuit 500 is in the high-light illuminance, the voltage generated by the photodetector PD1 may be higher than the threshold voltage of transistor SF, causing transistor SF to turn on. Additionally, the light-responsive switch circuit 300 may provide no voltage to transistor SF when the pixel circuit 500 is in the high-light illuminance.

In operation 930, electric charges are stored in a capacitor via an overflow current generated by the photodetector. For example, referring to FIG. 2C, the control signal SHDR is asserted (e.g., logic "1") while the remaining control signals RST1, RST2, TX, and RSL are de-asserted (e.g., logic "0"). At this time, transistor Q3 is turned on, and transistors Q1, Q2, Q4, and Q5 are turned off. Transistor SF may be turned off since its output path through the source (e.g., node N5) of transistor SF is cut off by transistor Q5. This allows the electric charges, which are overflowed in an overflow current from photodetector PD1 through transistor Q4, at floating node FN to be stored in the capacitor C through transistor Q3 along path 202 (e.g., a current leakage path).

In operation 940, a first voltage detected by the photodetector is outputted through the source-follower transistor. For example, referring to FIG. 2D, the control signals TX and RSL are asserted (e.g., logic "1") while the remaining control signals RST1, RST2, and SHDR are de-asserted (e.g., logic "0"). At this time, transistor Q4 and Q5 are turned on, and transistors Q1 to Q3 are turned off. Since transistor Q5 is turned on, the output path of transistor SF is conducted, and transistor SF is also turned on. Accordingly, the voltage level detected by the photodetector PD1 can be transferred to the source of transistor Q5 along path 204 (e.g. a current path) through transistors Q4, SF, and Q5, and the output voltage Vout can be read by the subsequent image-signal processor.

In operation 950, a second voltage associated with the electric charges stored in the capacitor is outputted through the source-follower transistor. For example, referring to FIG. 2E, the control signals SHDR and RSL are asserted (e.g., logic "1") while the remaining control signals RST1, RST2, and TX are de-asserted (e.g., logic "0"). At this time, transistor Q3 and Q5 are turned on, and transistor Q1, Q2, and Q4 are turned off. Since transistor Q5 is turned on, the output path of transistor SF is conducted, and transistor SF is also turned on. Accordingly, the voltage associated with the electric charges stored in the capacitor C can be transferred to the source of transistor Q5 along path 206 (e.g. a current path) from capacitor C through transistors Q3, SF, and Q5, and the output voltage Vout can be read by the subsequent image-signal processor.

It should be noted that the two output voltage Vout read by the subsequent image-signal processor in FIGS. 2D-2E can be used to obtain a high-dynamic range (HDR) pixel value. Additionally, with the technique of the 3D MIM LOFIC, the capacitor C can store more electric charges than existing techniques of integrated capacitors, thereby improving the dynamic range of the output HDR pixel value. It should also be noted that a global operation and a capacitor-reset operation are performed on the pixel circuit 500 before operation 930.

An aspect of the present disclosure provides a high-dynamic range (HDR) pixel circuit, which includes a first photodetector, a transfer gate, a mode-selection switch, a global reset switch, a capacitor, a capacitor-reset switch, a source-follower transistor, a row-selection switch, and a light-responsive switch circuit. The first photodetector includes an anode electrically connected to a first reference voltage and a cathode. The transfer gate includes a first terminal electrically connected to the cathode of the first photodetector and a second terminal electrically connected to a floating node. The mode-selection switch is coupled between the floating node and a first node. The global reset switch is coupled between the first node and a first power supply voltage. The capacitor is electrically connected between the first node and a second node. The capacitor-reset switch is coupled between the second node and a second power supply voltage. The source-follower transistor includes a gate electrically connected to the floating node, a drain electrically connected to a third node, and a source electrically connected to a fourth node. The row-selection switch is coupled between the fourth node and an output terminal of the pixel circuit. The light-responsive switch circuit is configured to selectively provide a third power supply voltage to the third node in response to an illuminance of an incident light of the pixel circuit.

Another aspect of the present disclosure provides a color-image sensor package structure, which includes a first die and a second die. The first die includes a pixel circuit, which includes a first photodetector, a transfer gate, a mode-selection switch, a global reset switch, a capacitor, a capacitor-reset switch, a source-follower transistor, a row-selection switch, and a light-responsive switch circuit. The first photodetector includes an anode electrically connected to a first reference voltage and a cathode. The transfer gate includes a first terminal electrically connected to the cathode of the first photodetector and a second terminal electrically connected to a floating node. The mode-selection switch is coupled between the floating node and a first node. The global reset switch is coupled between the first node and a first power supply voltage. The capacitor is electrically connected between the first node and a second node. The capacitor-reset switch is coupled between the second node and a second power supply voltage. The source-follower transistor includes a gate electrically connected to the floating node, a drain electrically connected to a third node, and a source electrically connected to a fourth node. The row-selection switch is coupled between the fourth node and an output terminal of the pixel circuit. The light-responsive switch circuit is configured to selectively provide a third power supply voltage to the third node in response to an illuminance of an incident light of the pixel circuit. The first die is stacked on the second die.

Yet another aspect of the present disclosure provides a method for operating a high-dynamic range (HDR) pixel circuit. The high-dynamic range pixel circuit includes a pixel subcircuit and a light-responsive switch circuit, and the pixel subcircuit includes a photodetector, a capacitor, and a source-follower transistor. The method includes the following steps: enabling the source-follower transistor using a power supply voltage provided by the light-responsive switch circuit in response to the HDR pixel circuit being in a low light illuminance; enabling the source-follower transistor using a first voltage generated by the photodetector in response to the HDR pixel circuit being in a high light illuminance; storing electric charges in the capacitor via an overflow current generated by the photodetector; outputting a first voltage detected by the photodetector through the source-follower transistor; and outputting a second voltage associated with the electric charges stored in the capacitor through the source-follower transistor.

The methods and features of the present disclosure have been sufficiently described in the provided examples and descriptions. It should be understood that any modifications or changes without departing from the spirit of the present disclosure are intended to be covered in the protection scope of the present disclosure.

Moreover, the scope of the present application is not intended to be limited to the particular embodiments of the process, machine, manufacture, and composition of matter, means, methods and steps described in the specification. As those skilled in the art will readily appreciate from the present disclosure, processes, machines, manufacture, composition of matter, means, methods or steps presently existing or later to be developed, that perform substantially the same function or achieve substantially the same result as the corresponding embodiments described herein, can be utilized according to the present disclosure.

Accordingly, the appended claims are intended to include within their scope processes, machines, manufacture, compositions of matter, means, methods or steps. In addition, each claim constitutes a separate embodiment, and the combination of various claims and embodiments are within the scope of the present disclosure.

What is claimed is:

1. A high-dynamic range (HDR) pixel circuit, comprising:
 a first photodetector, comprising an anode electrically connected to a first reference voltage and a cathode;
 a transfer gate, comprising a first terminal electrically connected to the cathode of the first photodetector and a second terminal electrically connected to a floating node;
 a mode-selection switch, coupled between the floating node and a first node;
 a global reset switch, coupled between the first node and a first power supply voltage;
 a capacitor, electrically connected between the first node and a second node;
 a capacitor-reset switch, coupled between the second node and a second power supply voltage;
 a source-follower transistor, comprising a gate electrically connected to the floating node, a drain electrically connected to a third node, and a source electrically connected to a fourth node;

a row-selection switch, coupled between the fourth node and an output terminal of the pixel circuit; and a light-responsive switch circuit, configured to selectively provide a third power supply voltage to the third node in response to an illuminance of an incident light of the pixel circuit.

2. The HDR pixel circuit of claim 1, wherein the capacitor is a three-dimensional metal-insulator-metal (3D MIM) lateral overflow integration capacitor (LOFIC).

3. The HDR pixel circuit of claim 2, wherein the global reset switch and the capacitor-reset switch are controlled by a first reset signal and a second reset signal, respectively, and before the pixel circuit starts to detect a voltage level corresponding to the illuminance of the incident light, a global reset operation and a capacitor-reset operation are performed sequentially.

4. The HDR pixel circuit of claim 3, wherein when the first reset signal is in a high logic state and the second reset signal is in a low logic state, the global reset operation is performed to reset the pixel circuits, and when the first reset signal is in the low logic state and the second reset signal is in the high logic state, the capacitor-reset operation is performed to discharge electric charges stored in the capacitor.

5. The HDR pixel circuit of claim 4, wherein the mode-selection switch is controlled by a mode-selection signal to switch between a standard dynamic range (SDR) mode and an HDR mode of the pixel circuit.

6. The HDR pixel circuit of claim 5, wherein the transfer gate and the row-selection switch are controlled by a first control signal and a second control signal, and when the mode-selection signal is in the high logic state and the first control signal and the second control signal are in the low logic state, an overflow current flows from the first photodetector to the capacitor through the transfer gate, the floating node, and the mode-selection switch.

7. The HDR pixel circuit of claim 6, wherein when the mode-selection signal is in the low logic state and the first control signal and the second control signal are in the high logic state, a first current flows from the first photodetector to the output terminal of the pixel circuit through the transfer gate, the source-follower transistor, and the row-selection switch to transfer a first voltage detected by the first photodetector to the output terminal of the pixel circuit.

8. The HDR pixel circuit of claim 7, wherein when the mode-selection signal and the second control signal are in the high logic state and the first control signal is in the low logic state, a second current flows from the capacitor to the output terminal of the pixel circuit through the mode-selection switch, the source-follower transistor, and the row-selection switch to transfer a second voltage associated with the electric charges stored in the capacitor to the output terminal of the pixel circuit.

9. The HDR pixel circuit of claim 1, wherein the light-responsive switch circuit comprises:
 a voltage source, coupled between a fifth node and a sixth node, and configured to provide a fixed voltage;
 a second photodetector, coupled between the sixth node and a seventh node;
 a first transistor, comprising a gate electrically connected to an eighth node, a drain electrically connected to the third node, and a source electrically connected to the fifth node; and
 a light-responsive switch, configured to connect the eighth node to the fifth node or the seventh node based on a voltage detected by the second photodetector.

10. The HDR pixel circuit of claim 9, wherein the light-responsive switch circuit further comprises: a second transistor, comprising a gate electrically connected to the eighth node, a drain electrically connected to the third node, and a source electrically connected to the seventh node.

11. The HDR pixel circuit of claim 9, wherein when the second photodetector detects a low light illuminance, the light-responsive switch connected the eighth node to the seventh node, and the third power supply voltage provided to the third node is substantially equal to the fixed voltage plus a first voltage detected the second photodetector.

12. The HDR pixel circuit of claim 11, wherein when the first photodetector detects the low light illuminance, a second voltage detected the first photodetector is lower than a threshold voltage of the source-follower transistor.

13. The HDR pixel circuit of claim 9, wherein when the second photodetector detects the high light illuminance, the light-responsive switch connected the eighth node to the seventh node, and the third power supply voltage provided to the third node is 0.

14. A color-image sensor package structure, comprising:
 a first die, comprising;
  a pixel circuit, comprising:
   a first photodetector, comprising an anode electrically connected to a first reference voltage and a cathode;
   a transfer gate, comprising a first terminal electrically connected to the cathode of the first photodetector and a second terminal electrically connected to a floating node;
   a mode-selection switch, coupled between the floating node and a first node;
   a global reset switch, coupled between the first node and a first power supply voltage;
   a capacitor, electrically connected between the first node and a second node;
   a capacitor-reset switch, coupled between the second node and a second power supply voltage;
   a source-follower transistor, comprising a gate electrically connected to the floating node, a drain electrically connected to a third node, and a source electrically connected to a fourth node;
   a row-selection switch, coupled between the fourth node and an output terminal of the pixel circuit; and
   a light-responsive switch circuit, configured to selectively provide a third power supply voltage to the third node in response to an illuminance of an incident light of the pixel circuit; and
 a second die, comprising:
  first logic circuitry, configured to obtain a high dynamic range (HDR) pixel value based on voltage signals obtained from the output terminal of the pixel circuit;
 wherein the first die is stacked on the second die.

15. The color-image sensor package structure of claim 14, wherein the first die is bonded to the second die with the first die being flipped.

16. The color-image sensor package structure of claim 15, wherein the capacitor is a three-dimensional metal-insulator-metal (3D MIM) lateral overflow integration capacitor (LOFIC) which includes one or more capacitor units connected series.

17. The color-image sensor package structure of claim 16, wherein each of the one or more capacitor units is gull-winged shaped.

18. The color-image sensor package structure of claim 16, further comprising: a third die, comprising second logic circuitry configured to perform image processing on the HDR pixel value obtained from the first logic circuitry.

19. A method for operating a high-dynamic range (HDR) pixel circuit, wherein the high-dynamic range pixel circuit comprises a pixel subcircuit and a light-responsive switch circuit, and the pixel subcircuit comprises a photodetector, a capacitor, and a source-follower transistor, the method comprising:

enabling the source-follower transistor using a power supply voltage provided by the light-responsive switch circuit in response to the HDR pixel circuit being in a low light illuminance;

enabling the source-follower transistor using a first voltage generated by the photodetector in response to the HDR pixel circuit being in a high light illuminance;

storing electric charges in the capacitor via an overflow current generated by the photodetector;

outputting a first voltage detected by the photodetector through the source-follower transistor; and outputting a second voltage associated with the electric charges stored in the capacitor through the source-follower transistor.

20. The method of claim 19, wherein before storing electric charges in the capacitor via an overflow current generated by the photodetector, the method further comprises:

performing a global reset operation on the HDR pixel circuit; and performing a capacitor-reset operation to discharge the electric charges stored in the capacitor, wherein the capacitor is a three-dimensional metal-insulator-metal (3D MIM) lateral overflow integration capacitor (LOFIC).

* * * * *